United States Patent
Dong et al.

(10) Patent No.: US 11,296,974 B2
(45) Date of Patent: Apr. 5, 2022

(54) INFORMATION PROCESSING METHOD, ELECTRONIC DEVICE AND COMPUTER STORAGE MEDIUM

(71) Applicant: EMC IP Holding Company LLC, Hopkinton, MA (US)

(72) Inventors: Shixu Dong, Shanghai (CN); Chenxi Hu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 199 days.

(21) Appl. No.: 16/827,082

(22) Filed: Mar. 23, 2020

(65) Prior Publication Data

US 2021/0243109 A1 Aug. 5, 2021

(30) Foreign Application Priority Data

Jan. 31, 2020 (CN) .......................... 202010077768.4

(51) Int. Cl.
*H04L 45/021* (2022.01)
*H04L 45/42* (2022.01)
(Continued)

(52) U.S. Cl.
CPC ........ *H04L 45/021* (2013.01); *H04L 12/5601* (2013.01); *H04L 45/42* (2013.01);
(Continued)

(58) Field of Classification Search
CPC ... H04L 45/021; H04L 12/5601; H04L 45/42; H04L 45/566; H04L 69/22;
(Continued)

(56) References Cited

U.S. PATENT DOCUMENTS

| | | | |
|---|---|---|---|
| 6,735,198 B1* | 5/2004 | Edsall | H04L 45/54 370/389 |
| 2018/0198715 A1* | 7/2018 | Shmilovici | H04L 45/74 |

(Continued)

OTHER PUBLICATIONS

B. N. Astuto et al., "A Survey of Software-Defined Networking: Past, Present, and Future of Programmable Networks." Communications Surveys and Tutorials, IEEE Communications Society, IEEE, vol. 16, No. 3, Jan. 22, 2014, pp. 1617-1634.

(Continued)

*Primary Examiner* — Kibrom T Hailu
(74) *Attorney, Agent, or Firm* — Ryan, Mason & Lewis, LLP

(57) ABSTRACT

In illustrative embodiments, an information processing method, an electronic device, and a computer-readable storage medium are provided. The method includes: if it is determined that a predetermined indicator is detected in a header of a received packet, acquiring information for indicating a source port, a destination port, a forwarding indicator, a process identifier, and a maximum number of processes of the packet from the header; updating a port forwarding table based on the source port, the destination port, and the forwarding indicator; performing a user-defined action on the packet to obtain a result packet; and if it is determined that a quantity of process identifiers reaches the maximum number of processes, determining one or more forwarding ports for the result packet based on the maximum number of processes, the forwarding indicator, and the updated port forwarding table, to forward the result packet to the one or more forwarding ports.

20 Claims, 11 Drawing Sheets

(51) Int. Cl.
*H04L 69/22* (2022.01)
*H04L 12/54* (2022.01)
*H04L 45/00* (2022.01)
*H04L 12/70* (2013.01)

(52) U.S. Cl.
CPC ............ *H04L 45/566* (2013.01); *H04L 69/22* (2013.01); *H04L 2012/5641* (2013.01)

(58) Field of Classification Search
CPC . H04L 2012/5641; H04L 49/30; H04L 49/25; H04L 49/3009
See application file for complete search history.

(56) References Cited

U.S. PATENT DOCUMENTS

2019/0238363 A1* 8/2019 Boutros .................. H04L 45/34
2021/0212163 A1* 7/2021 Kobayashi .............. H04L 45/38

OTHER PUBLICATIONS

Wikipedia, "Software-Defined Networking." https://en.wikipedia.org/wiki/Software-defined_networking, Mar. 22, 2020, 12 pages.

* cited by examiner

INFORMATION PROCESSING METHOD, ELECTRONIC DEVICE AND COMPUTER STORAGE MEDIUM

RELATED APPLICATION(S)

The present application claims priority to Chinese Patent Application No. 202010077768.4, filed Jan. 31, 2020, and entitled "Information Processing Method, Electronic Device and Computer Storage Medium," which is incorporated by reference herein in its entirety.

FIELD

Embodiments of the present disclosure generally relate to the field of information processing, and in particular, to an information processing method, an electronic device and a computer storage medium.

BACKGROUND

With the development of software-defined networks, there are ever increasing expectations for network programmability and automation. Programmable switches are defined to solve this problem. A traditional switch only supports the basic rules for forwarding packets and cannot provide a more flexible solution for adaptation to meet network requirements. A current switch simulator is mainly based on the architecture of the traditional switch, so it only supports the basic rules for forwarding packets and lacks flexibility.

SUMMARY

Embodiments of the present disclosure provide an information processing method, an electronic device, and a computer storage medium, so as to achieve a flexible operation and forwarding of packets.

According to a first aspect of the present disclosure, an information processing method is provided. The method includes: if it is determined that a predetermined indicator is detected in a header of a received packet, acquiring information for indicating a source port, a destination port, a forwarding indicator, a process identifier, and a maximum number of processes of the packet from the header; updating a port forwarding table based on the source port, the destination port, and the forwarding indicator; performing a user-defined action on the packet to obtain a result packet; and if it is determined that a quantity of process identifiers reaches the maximum number of processes, determining one or more forwarding ports for the result packet based on the maximum number of processes, the forwarding indicator, and the updated port forwarding table, to forward the result packet to the one or more forwarding ports.

According to a second aspect of the present disclosure, an electronic device is provided. The device includes at least one processing unit and at least one memory. The at least one memory is coupled to the at least one processing unit, and stores instructions executed by the at least one processing unit. The instructions, when executed by the at least one processing unit, enable the device to execute actions. The actions include: if it is determined that a predetermined indicator is detected in a header of a received packet, acquiring information for indicating a source port, a destination port, a forwarding indicator, a process identifier, and a maximum number of processes of the packet from the header; updating a port forwarding table based on the source port, the destination port, and the forwarding indicator; performing a user-defined action on the packet to obtain a result packet; and if it is determined that a quantity of process identifiers reaches the maximum number of processes, determining one or more forwarding ports for the result packet based on the maximum number of processes, the forwarding indicator, and the updated port forwarding table, to forward the result packet to the one or more forwarding ports.

According to a third aspect of the present disclosure, a computer-readable storage medium is provided. The computer-readable storage medium stores a computer program that, when executed by a machine, enables the machine to implement any steps of the method described according to the first aspect of the present disclosure.

This Summary is provided to introduce selections of concepts in a simplified form, which will be further illustrated below in detailed description. The Summary is not intended to identify key features or essential features of the present disclosure, nor intended to limit the scope of the present disclosure.

BRIEF DESCRIPTION OF THE DRAWINGS

The above and other objectives, features and advantages of the present disclosure will become more apparent by describing example embodiments thereof in detail with reference to the accompanying drawings, and in the example embodiments of the present disclosure, the same reference numerals generally represent the same components.

In each drawing, the same or corresponding reference numerals represent the same or corresponding parts.

DETAILED DESCRIPTION

Figure 1:
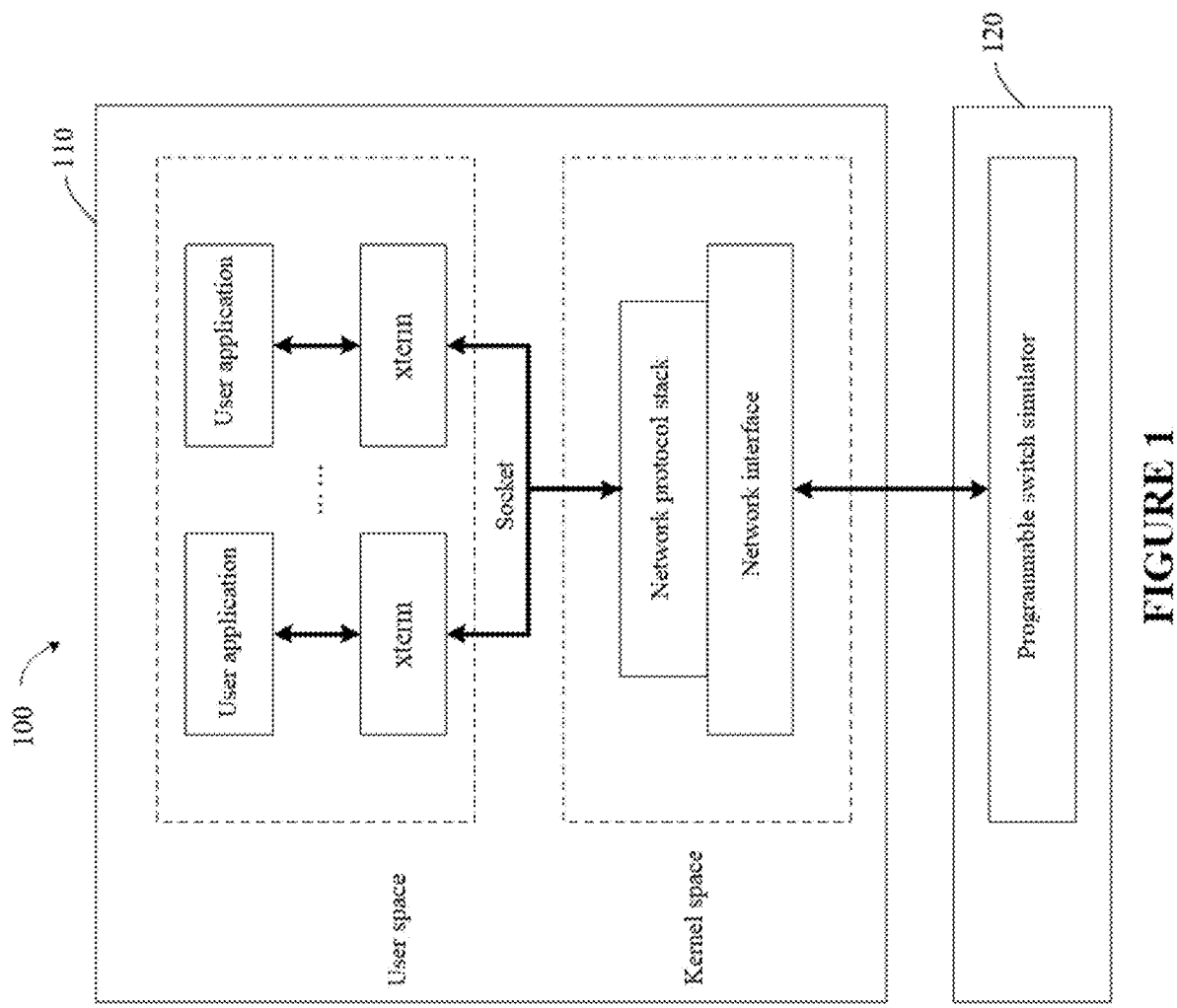
FIG. 1 illustrates a schematic diagram of an example of an information processing environment according to an embodiment of the present disclosure.

Illustrative embodiments of the present disclosure will be described in more detail below with reference to the accompanying drawings. Although the drawings show illustrative embodiments, it should be understood that the present disclosure may be implemented in various forms and should not be limited to the particular embodiments illustrated here. Rather, these embodiments are provided to make the present disclosure more thorough and complete, and will fully convey the scope of the present disclosure to those skilled in the art.

As used herein, the term "include" and variations thereof mean open-ended inclusion, that is, "including but not limited to." Unless specifically stated, the term "or" means "and/or." The term "based on" means "based at least in part on." The term "one example embodiment" and "one embodiment" mean "at least one example embodiment." The term "another embodiment" means "at least one another embodiment." The terms "first," "second," etc. may refer to different or the same objects. Other explicit and implicit definitions may also be included below.

As mentioned above, with the development of a software-defined network (SDN), programmable switches have begun to emerge. For developers, there is not always a chance to get a hardware programmable switch to deploy their applications, because hardware is new and expensive. Simulators for programmable switches have not yet emerged. Most switch simulators are defined based on the architecture of traditional switches. These traditional switches only support the basic rules for forwarding packets, but in programmable switches, it is expected to support more flexible rules or calculations.

In addition, when a connection between application processes is established, the form of a packet is fixed. However, not all headers or tuples in the packet are useful. This may cause a lot of redundancy in data transmission, especially in high-speed transmission situations, such as 5G.

In order to at least partially solve one or more of the above problems and other potential problems, example embodiments of the present disclosure provide an information processing solution. In this solution, if it is determined that a predetermined indicator is detected in a header of a received packet, information for indicating a source port, a destination port, a forwarding indicator, a process identifier, and a maximum number of processes of the packet is acquired from the header; a port forwarding table is updated based on the source port, the destination port, and the forwarding indicator; a user-defined action is performed on the packet to obtain a result packet; and if it is determined that a quantity of process identifiers reaches the maximum number of processes, one or more forwarding ports for the result packet are determined based on the maximum number of processes, the forwarding indicator, and the updated port forwarding table, to forward the result packet to the one or more forwarding ports.

Therefore, the user-defined action for the packet and forwarding of packets from a plurality of processes are supported, thereby achieving a flexible operation and forwarding of the packets.

In the following, specific examples of this solution will be described in more detail with reference to the drawings.

FIG. 1 illustrates a schematic diagram of an example of information processing environment 100 according to an embodiment of the present disclosure. Information processing environment 100 may include terminal device 110 and server 120.

In some embodiments, terminal device 110 is configured to send (e.g., to server 120) a packet of a user application. Terminal device 110 may be an electronic device having networking capabilities. Terminal device 110 is, for example, but is not limited to, a laptop computer, a tablet computer, a personal computer, and the like.

The user application may run on terminal device 110. In some embodiments, a plurality of user applications may run on one terminal device 110. In some other embodiments, a plurality of user applications may run on a plurality of terminal devices 110. The user applications may run in a user space, such as on xterm, which is similar to a program running on an operating system such as Linux.

Server 120 includes, but is not limited to, a personal computer, a server computer, a multiprocessor system, a mainframe computer, a distributed computing environment including any one of the above systems or devices, and the like. In some embodiments, server 120 may have one or more processing units, including dedicated processing units such as a GPU, an FPGA, and an ASIC, and general-purpose processing units such as a CPU. In addition, one or more virtual machines may also run on server 120.

Server 120 is configured to receive a packet, and perform a user-defined action on the packet to obtain a result packet. Server 120 may also be configured to determine one or more forwarding ports for the result packet to forward the result packet to the one or more forwarding ports. Server 120 may run a programmable switch simulator. The programmable switch simulator may also, for example, run on the xterm.

Packets from the user application will be sent from a processor of terminal device 110 to the programmable switch simulator of server 120. The connection between the user application and the programmable switch simulator may include a socket, such as a Linux socket. The connection may be established by using, for example, the TCP.

In some embodiments, server 120 may send the result packet back to the same user application after processing the packet from the user application via the programmable switch simulator. In some embodiments, server 120 may send the result packet back to a different user application after processing the packet from the user application via the programmable switch simulator.

It should be understood that although two user applications are shown in FIG. 1, this is only an example, and more or fewer user applications may be included. It should also be understood that although one terminal device is shown in FIG. 1, this is only an example, and more terminal devices may be included.

It should be understood that although FIG. 1 shows that the programmable switch simulator runs on server 120 and the application runs on terminal device 110, this is only an example. The programmable switch simulator and the application may run on the same device, for example, the same terminal device 110 or the same server 120, or may run on different devices, such as on different terminal devices.

Figure 2:
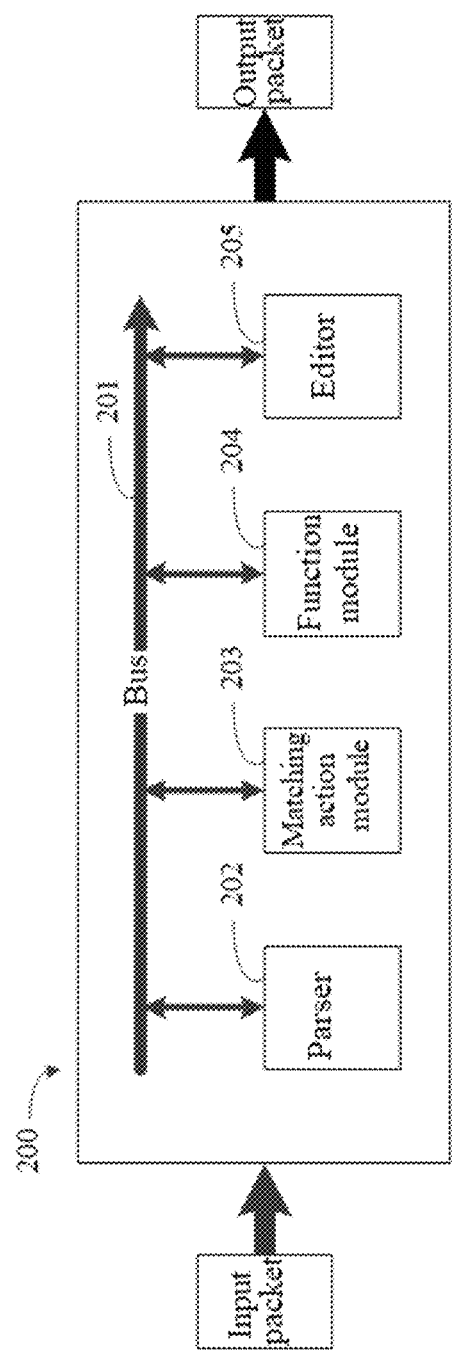
FIG. 2 illustrates a schematic block diagram of a programmable switch simulator according to an embodiment of the present disclosure.

FIG. 2 illustrates a schematic block diagram of programmable switch simulator 200 according to an embodiment of the present disclosure. As shown in FIG. 2, programmable switch simulator 200 may include bus 201, parser 202, matching action module 203, function module 204, and editor 205. Each module may interact with its neighboring modules by reading and writing one or more buses 201. For example, bus 201 may pass through the modules to form pipelines. The modules may modify bus tuples as they pass through.

Bus 201 may carry packet data in a packet processing pipeline and start from and terminate at ends of the respective pipeline.

Parser 202 may accommodate existing, customized, and new protocols, and may extract a header tuple from the packet.

Matching action module 203 may include a matching action table, which allows a user to define a modifiable data structure. The user may specify keywords and policy tuples stored in the table, and the matching action table may allow the user to specify a tuple designating method for processing the tuples.

Function module 204 may be used at different stages to achieve the flexibility in exchange decisions. This module may be designed primarily by the user. It may allow conditional declarations, assignment declarations, and complex operations for data transformation in the bus.

Editor 205 may be configured to modify the header of the packet, and to add, modify, and delete headers at various header offsets.

The packet processing may start from parser 202, and matching action module 203 and function module 204 may be involved in a mixed manner, and the sequence thereof indicates a packet processing stage. Editor 205 may be located at the end.

For each of these modules, a target simulator may choose to include a plurality of such modules, and may arrange the modules in any order.

Figure 3:
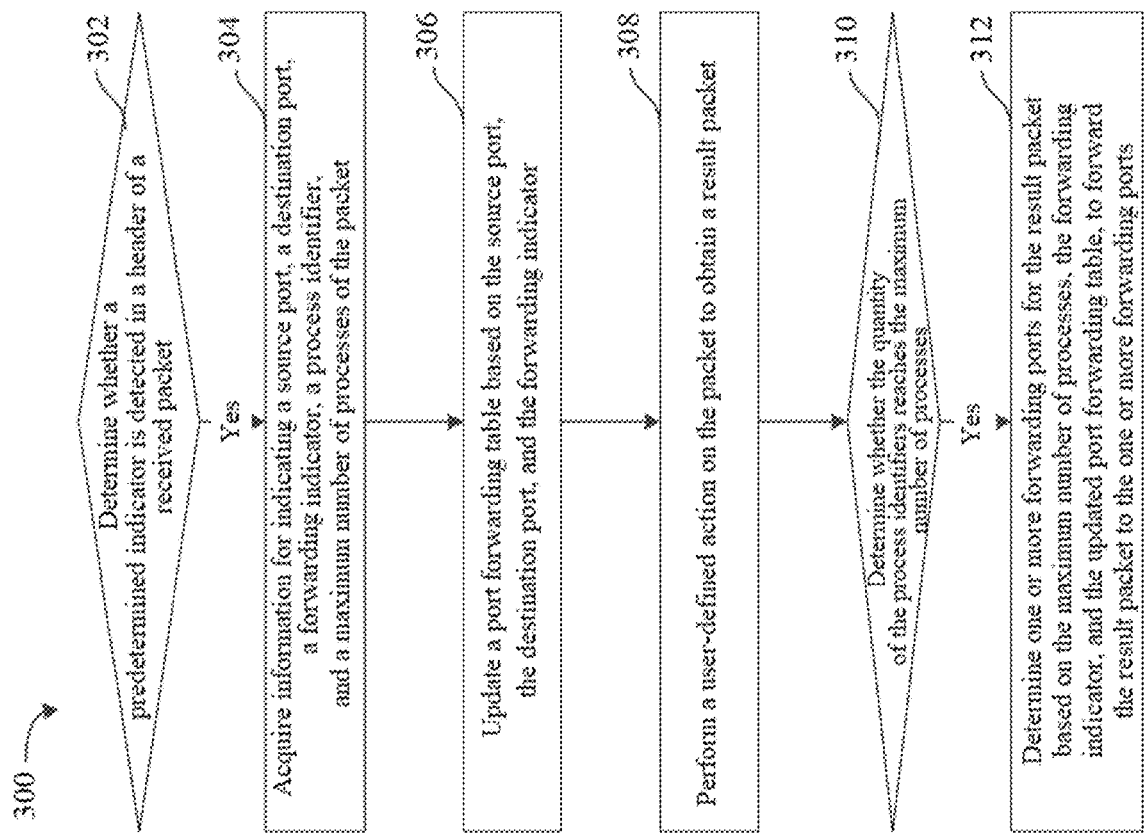
FIG. 3 illustrates a schematic flow chart of an information processing method according to an embodiment of the present disclosure.

FIG. 3 illustrates a flow chart of information processing method 300 according to an embodiment of the present disclosure. It should be understood that method 300 may be performed, for example, at electronic device 1100 described in FIG. 11, and may also be performed by terminal device 110 or server 120 shown in FIG. 1. It should be understood that method 300 may further include additional blocks not shown and/or the blocks shown may be omitted, and the scope of the present disclosure is not limited in this regard.

At block 302, whether a predetermined indicator is detected in a header of a received packet is determined. The predetermined indicator may be configured to indicate that the packet is sent to a programmable switch simulator. The predetermined indicator may be located at, for example, a predetermined position of the header of the packet, such as a start position of the header. For example, one bit of the start position of the header may be used as the predetermined indicator. For example, it is determined that the value of the bit being 1 can determine that the predetermined indicator is detected.

In some embodiments, before block 302, method 300 may further include the steps of initialization of the programmable switch simulator and running of a network topology. Initialization of the programmable switch simulator may include launching of a simulator program, such as a script, to monitor the input packet. Running of the network topology may include generation of a switch and a user application based on network topology configuration information, such as a network topology configuration file. After this, the packet may be received from the user application.

If it is determined at block 302 that a predetermined indicator is detected in the header of the received packet, at block 304, information for indicating a source port, a destination port, a forwarding indicator, a process identifier, and a maximum number of processes of the packet is acquired from the header.

The forwarding indicator is used to indicate a forwarding state of the packet. For example, the forwarding indicator may range from 0x00 to 0xFF, where 0x00 may be used to indicate unicast, 0x01-0xFE may be used to indicate multicast, and 0xFF may be used to indicate broadcast. It should be understood that this is just an example, and there may be other ranges and other corresponding relations. For example, 0x00 indicates broadcast and 0xFF indicates unicast.

The process identifier is configured to identify an application process that sends the packet. The maximum number of processes is used to indicate the maximum number of application processes that send the packets. The source port and the destination port may be the same or different. The source port and the destination port may range, for example, from 0x00 to 0xFF. It should be understood that this is only an example, and other ranges are possible.

In some embodiments, acquiring the information for indicating the source port, the destination port, the forwarding indicator, the process identifier, and the maximum number of processes of the packet from the header may include: extracting a tuple for indicating a header structure of the packet from the header, and extracting tuples for indicating the source port, the destination port, the forwarding indicator, the process identifier, and the maximum number of processes from the header based on the tuple. The packet structure will be described in detail below with reference to FIG. 10.

At block 306, a port forwarding table is updated based on the source port, the destination port, and the forwarding indicator.

An entry of the port forwarding table may contain three items: the source port, the destination port, and the forwarding indicator, as shown in Table 1 below.

TABLE 1

| Source port | Destination port | Forwarding indicator |
| --- | --- | --- |

The process of updating the port forwarding table will be described in detail below with reference to FIG. 4.

At block 308, a user-defined action is performed on the packet to obtain a result packet.

The user-defined action may include, for example, various logical operations and/or arithmetic operations.

In some embodiments, performing the user-defined action on the packet may include: performing the user-defined action on the packet and a previous result packet to obtain the result packet. In one example, a user-defined operation may be performed on load data of the packet and load data of the previous result packet to obtain the result packet. For example, the logic operations and/or arithmetic operations, such as an adding operation and a multiplication operation, are performed on the load data of the packet and the load data of the previous result packet to obtain the result packet.

At block 310, whether the quantity of the process identifiers reaches the maximum number of processes is determined. The quantity of the process identifiers may be accumulated based on, for example, the process identifiers in the previously received packet and the currently received packet. For example, during processing of the previous packet, the quantity of the previous process identifiers may be stored. The quantity of the process identifiers may be obtained based on the quantity of the stored previous process identifiers and the process identifiers included in the current packet.

If it is determined at block 310 that the quantity of the process identifiers reaches the maximum number of processes, at block 312, one or more forwarding ports for the result packet are determined based on the maximum number of processes, the forwarding indicator, and the updated port forwarding table, to forward the result packet to the one or more forwarding ports. The process of determining the one or more forwarding ports for the result packet will be described in detail below with reference to FIG. 5.

In some embodiments, method 300 may further include: forwarding the result packet to the one or more forwarding ports, so as to forward the result packet to one or more application processes corresponding to the one or more forwarding ports.

Therefore, the user-defined action may be performed on the packet, and forwarding of packets from a plurality of processes can be supported, thereby achieving a flexible operation and forwarding of the packets. In addition, by performing the user-defined action on the packet and the previous result packet to obtain the result packet, processing results of the packets from the plurality of processes may be accumulated, and the accumulated results are forwarded to achieve more complex functions.

Figure 4:
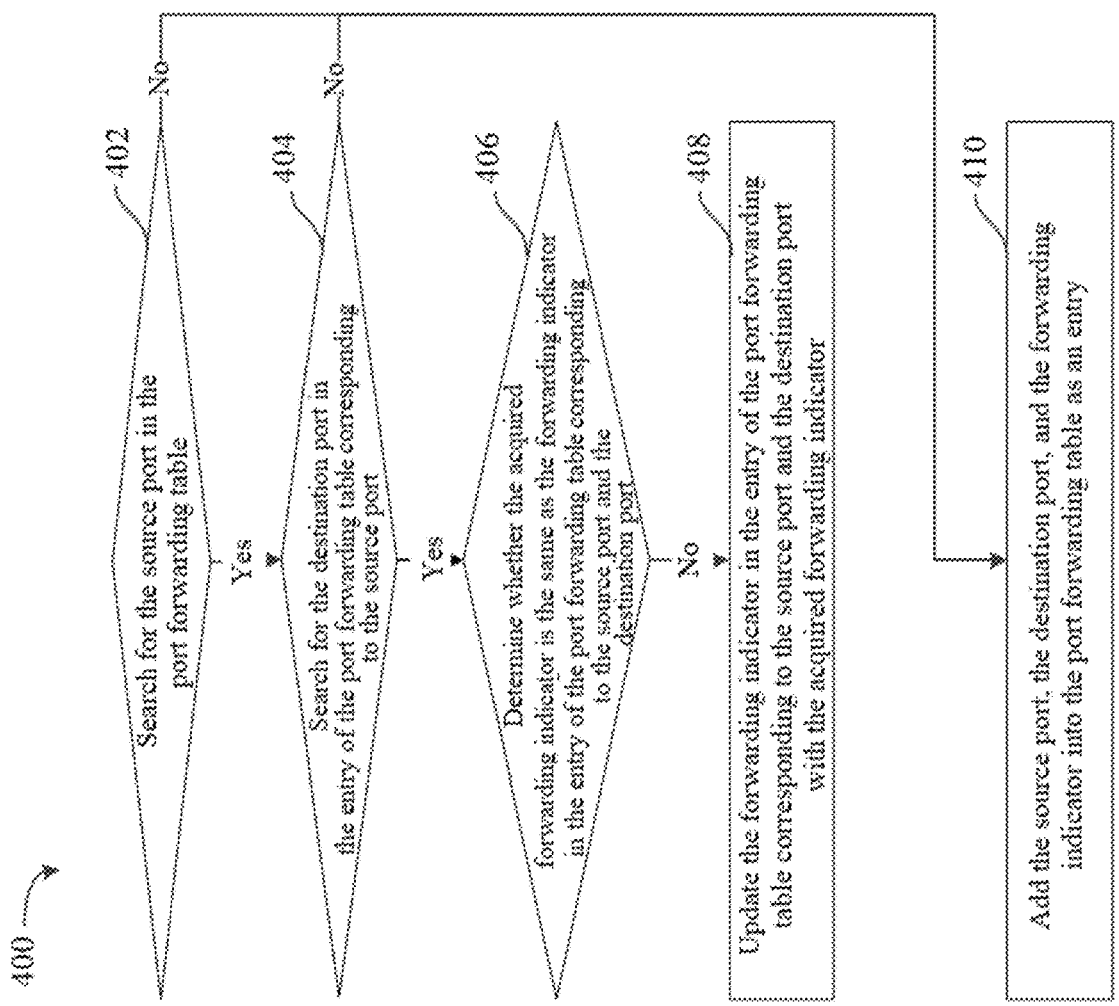
FIG. 4 illustrates a flow chart of a method for updating a port forwarding table according to an embodiment of the present disclosure.

FIG. 4 illustrates a flow chart of method 400 for updating the port forwarding table according to an embodiment of the present disclosure. For example, method 400 may be performed by terminal device 110 or server 120 shown in FIG. 1, or may be performed at electronic device 1100 described in FIG. 11. It should be understood that method 400 may further include additional blocks not shown and/or the blocks shown may be omitted, and the scope of the present disclosure is not limited in this regard.

At block 402, the source port is searched for in the port forwarding table.

If it is determined at block 402 that the source port is not found in the port forwarding table, the source port, the destination port, and the forwarding indicator are added into the port forwarding table as an entry at block 410.

If it is determined at block 402 that the source port is found in the port forwarding table, the destination port is searched for in the entry of the port forwarding table corresponding to the source port, at block 404.

If it is determined at block 404 that the destination port is not found in the entry of the port forwarding table corresponding to the source port, the source port, the destination port, and the forwarding indicator are added into the port forwarding table as an entry at block 410.

If it is determined at block 404 that the destination port is found in the entry of the port forwarding table corresponding to the source port, whether the acquired forwarding indicator is the same as the forwarding indicator in the entry of the port forwarding table corresponding to the source port and the destination port is determined at block 406.

If it is determined at block 406 that the acquired forwarding indicator is different from the forwarding indicator in the entry of the port forwarding table corresponding to the source port and the destination port the forwarding indicator in the entry of the port forwarding table corresponding to the source port and the destination port is updated with the acquired forwarding indicator at block 408.

Therefore, the port forwarding table may be updated when a new source port, a new destination port corresponding to the existing source port, and a new forwarding indicator corresponding to the existing source port and destination port are found, which is convenient for the forwarding of subsequent packets.

One example is taken below to illustrate above method 400. For example, if an initial state of the port forwarding table is shown in Table 2, it includes two entries, one entry indicates that the source port, the destination port, and the forwarding indicator are 1, 2, and 0x00, and the other entry indicates 2, 3, and 0xFF.

TABLE 2

| Source port | Destination port | Forwarding indicator |
|---|---|---|
| 1 | 2 | 0x00 |
| 2 | 3 | 0xFF |

If the acquired source port, destination port and forwarding indicator are respectively 3, 4, and 0x00, it is determined that source port 3 is not found in the port forwarding table, and source port 3, destination port 4, and forwarding indicator 0x00 are added into the port forwarding table as an entry. The updated port forwarding table may be shown in Table 3:

TABLE 3

| Source port | Destination port | Forwarding indicator |
|---|---|---|
| 1 | 2 | 0x00 |
| 2 | 3 | 0xFF |
| 3 | 4 | 0x00 |

If the acquired source port, destination port and forwarding indicator are respectively 2, 4, and 0x00, it is determined that the source port 2 is found in the port forwarding table, and then acquired destination port 4 is searched for in the entry of the port forwarding table corresponding to source port 2, that is, acquired destination port 4 is searched for in the entry indicating 2, 3, and 0xFF. If it is determined that the acquired destination 4 is not found in the entry indicating 2, 3, and 0xFF, source port 2, destination port 4, and forwarding indicator 0x00 are added into the port forwarding table as an entry. The updated port forwarding table may be shown in Table 4:

TABLE 4

| Source port | Destination port | Forwarding indicator |
|---|---|---|
| 1 | 2 | 0x00 |
| 2 | 3 | 0xFF |
| 2 | 4 | 0x00 |

If the acquired source port, destination port, and forwarding indicator are 2, 3, and 0x00, respectively, it is determined that acquired destination 3 is found in the entry indicating 2, 3, and 0xFF, and whether acquired forwarding indicator 0x00 is the same as forwarding indicator 0xFF in the entry indicating 2, 3, and 0xFF is determined. It is determined that 0x00 is different from 0xFF here, and thus forwarding indicator 0xFF in the entry indicating 2, 3, and 0xFF is modified as 0x00. The updated port forwarding table may be shown in Table 5:

TABLE 5

| Source port | Destination port | Forwarding indicator |
|---|---|---|
| 1 | 2 | 0x00 |
| 2 | 3 | 0x00 |

Figure 5:
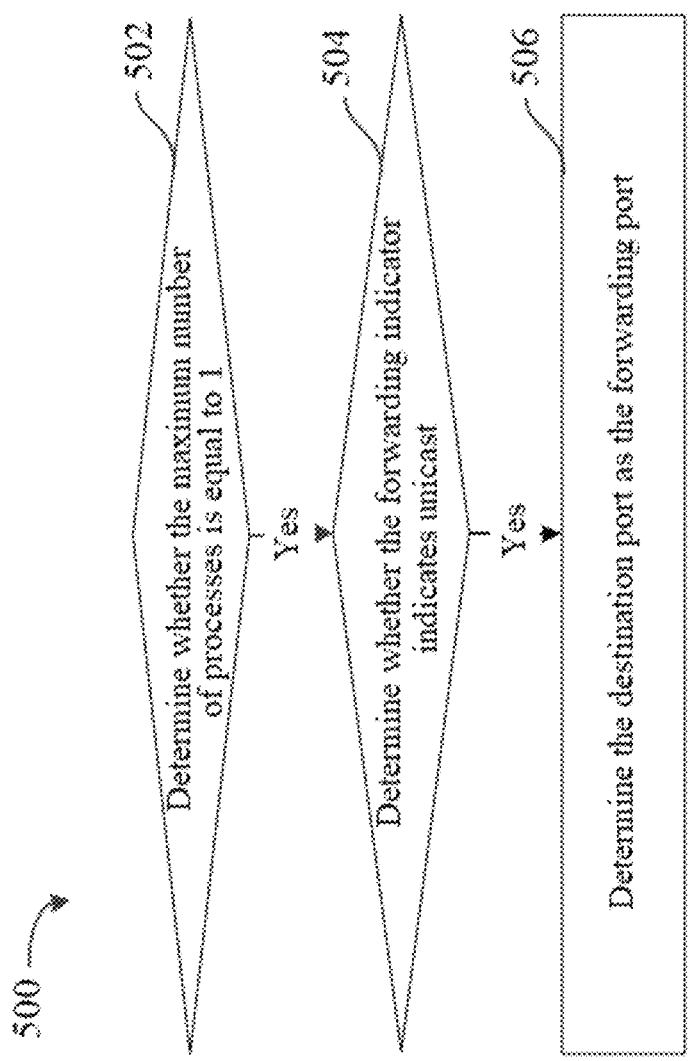
FIG. 5 illustrates a flow chart of a method for determining one or more forwarding ports for a result packet according to an embodiment of the present disclosure.

FIG. 5 illustrates a flow chart of method 500 for determining the one or more forwarding ports for the result packet according to an embodiment of the present disclosure. For example, method 500 may be performed by terminal device 110 or server 120 shown in FIG. 1. It should be understood that method 500 may further include additional blocks not shown and/or the blocks shown may be omitted, and the scope of the present disclosure is not limited in this regard.

At block 502, whether the maximum number of processes is equal to 1 is determined.

If it is determined at block 502 that the maximum number of processes is equal to 1, at block 504, whether the forwarding indicator indicates unicast is determined. For example, whether the forwarding indicator is equal to 0x00 is determined. If it is determined that the forwarding indicator is equal to 0x00, it is determined that the forwarding indicator indicates unicast.

If it is determined at block 504 that the forwarding indicator indicates unicast, at block 506, it is determined that the destination port is the forwarding port.

Therefore, a unicast forwarding port of the packet may be determined.

Figure 6:
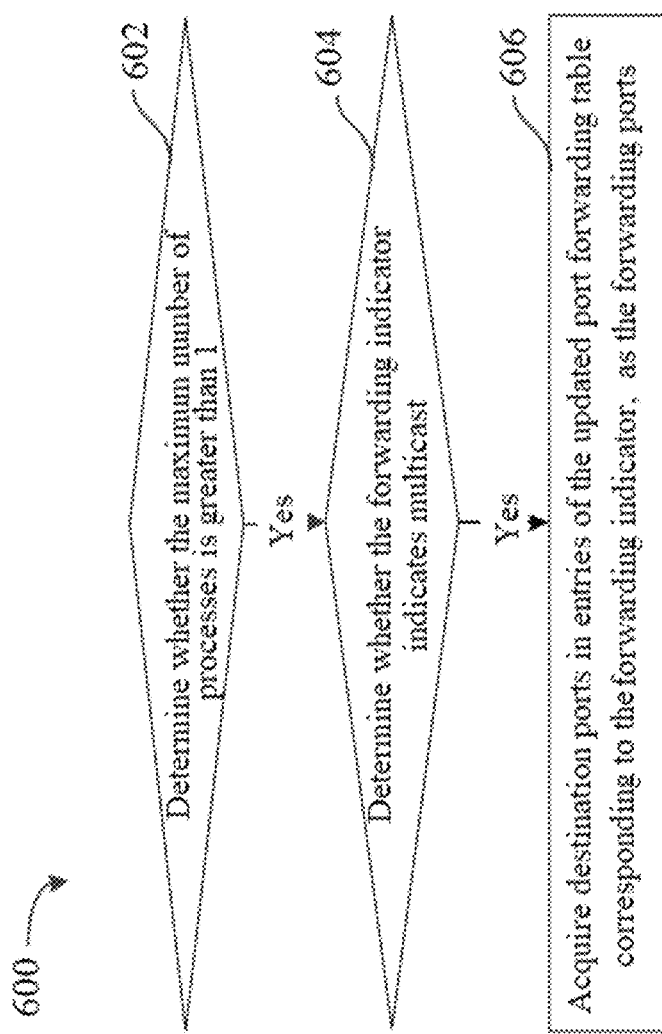
FIG. 6 illustrates a flow chart of a method for determining one or more forwarding ports for a result packet according to an embodiment of the present disclosure.

FIG. 6 illustrates a flow chart of method 600 for determining the one or more forwarding ports for the result packet according to an embodiment of the present disclosure. For example, method 600 may be performed by terminal device 110 or server 120 shown in FIG. 1. It should be understood that method 600 may further include additional blocks not shown and/or the blocks shown may be omitted, and the scope of the present disclosure is not limited in this regard.

At block 602, whether the maximum number of processes is greater than 1 is determined.

If it is determined at block 602 that the maximum number of processes is greater than 1, at block 604, whether the forwarding indicator indicates multicast is determined. For example, whether the forwarding indicator is greater than 0x00 and less than 0xFF is determined. If it is determined that the forwarding indicator is greater than 0x00 and less than 0xFF, it is determined that the forwarding indicator indicates multicast.

If it is determined at block 604 that the forwarding indicator indicates multicast, at block 606, the destination ports in the entries of the updated port forwarding table corresponding to the forwarding indicator are acquired to be taken as the forwarding ports.

For example, the updated port forwarding table may be shown in Table 6:

TABLE 6

| Source port | Destination port | Forwarding indicator |
|---|---|---|
| 1234 | 1234 | 0x05 |
| 1235 | 1235 | 0x05 |
| 1236 | 1236 | 0x05 |
| 1237 | 1237 | 0x05 |
| 1238 | 1238 | 0x00 |

As shown in Table 6, the port forwarding table includes 5 entries. If the acquired forwarding indicator is 0x05, it is determined that the forwarding indicator indicates multicast, and the destination ports, that is, port 1234, port 1235, port 1236, and port 1237, in the entries of the port forwarding table corresponding to the forwarding indicator 0x05 are acquired, and are used as forwarding ports.

Therefore, this may support multicast forwarding of the packets from a plurality of processes. Since only the ports and the forwarding indicators are needed for the multicast, the multicast forwarding may be independent of specific protocols. In addition, since the port forwarding table may be updated based on the data of the packet from the application before final forwarding, a multicast behavior of the simulator may be updated in a timely manner.

Figure 7:
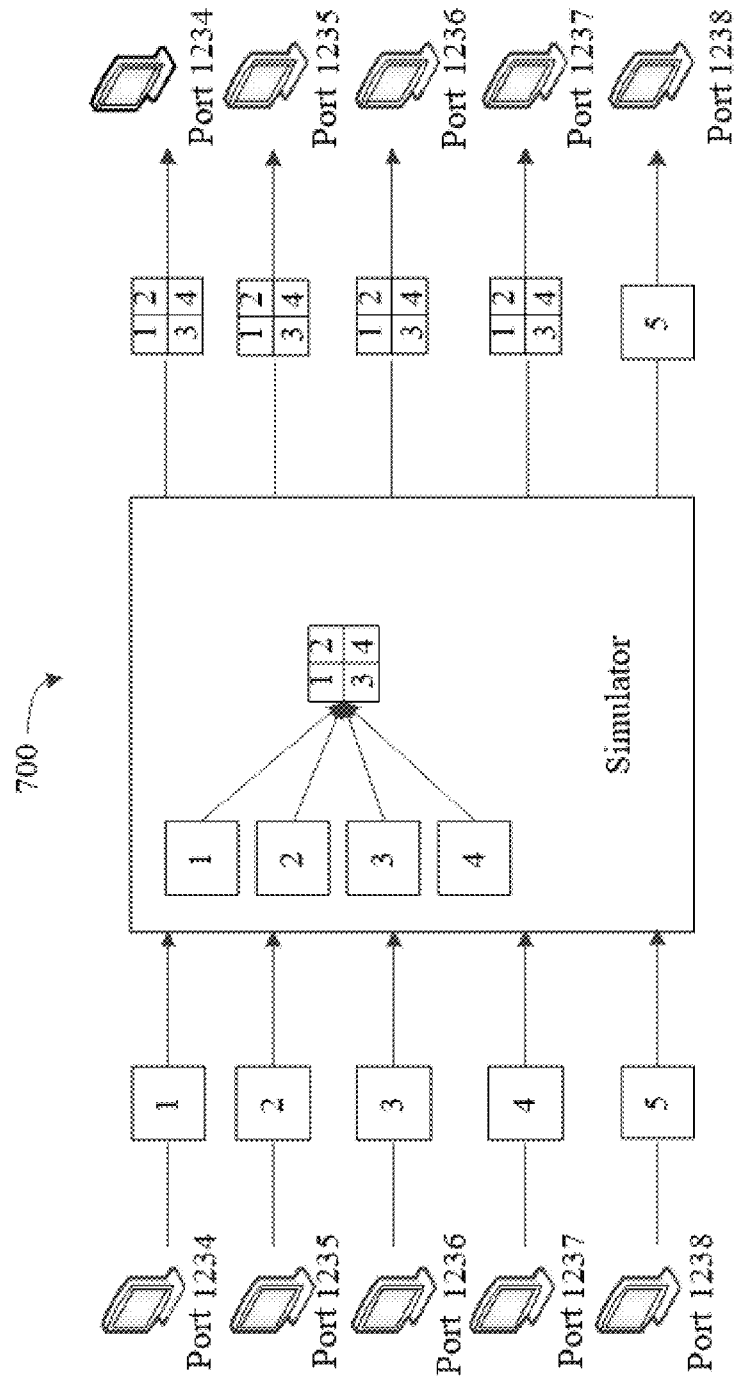
FIG. 7 illustrates a schematic diagram of multicast according to an embodiment of the present disclosure.

As described above, in some embodiments, the result packet may be obtained by performing the user-defined action on the received packet and the previous result packet. In this case, the situation of a multicast result packet may be as shown in diagram 700 of FIG. 7, where a single block represents the packet from the application process, and a grid block represents the result packet from the simulator. After packet 1, packet 2, packet 3, and packet 4 from port 1234, port 1235, port 1236, and port 1237 are accumulated by the simulator to obtain the result packet, the result packet is multicast to port 1234, port 1235, port 1236, and port 1237. Therefore, an accumulation result of the packets from a plurality of processes can be forwarded in multicast, thereby realizing more complex functions.

Figure 8:
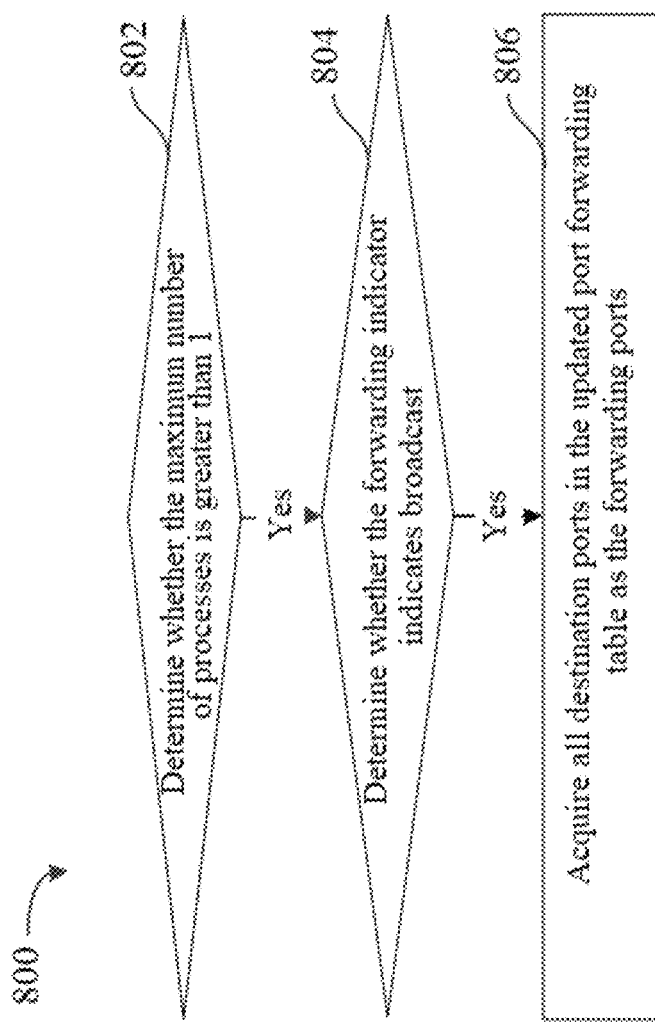
FIG. 8 illustrates a flow chart of a method for determining one or more forwarding ports for a result packet according to an embodiment of the present disclosure.

FIG. 8 illustrates a flow chart of method 800 for determining the one or more forwarding ports for the result packet according to an embodiment of the present disclosure. For example, method 800 may be performed by terminal device 110 or server 120 shown in FIG. 1. It should be understood that method 800 may further include additional blocks not shown and/or the blocks shown may be omitted, and the scope of the present disclosure is not limited in this regard.

At block 802, whether the maximum number of processes is greater than 1 is determined.

If it is determined at block 802 that the maximum number of processes is greater than 1, at block 804, whether the forwarding indicator indicates broadcast is determined. For example, whether the forwarding indicator is equal to 0xFF is determined. If it is determined that the forwarding indicator is equal to 0xFF, it is determined that the forwarding indicator indicates broadcast.

If it is determined at block 804 that the forwarding indicator indicates broadcast, at block 806, all destination ports in the updated port forwarding table are acquired to be taken as the forwarding ports.

For example, the updated port forwarding table may be shown in Table 7:

TABLE 7

| Source port | Destination port | Forwarding indicator |
|---|---|---|
| 1234 | 1234 | 0xFF |
| 1235 | 1235 | 0xFF |
| 1236 | 1236 | 0xFF |
| 1237 | 1237 | 0xFF |
| 1238 | 1238 | 0x01 |

As shown in Table 7, the port forwarding table includes 5 entries. If the acquired forwarding indicator is 0xFF, it is determined that the forwarding indicator indicates broadcast, and all the destination ports, i.e., port 1234, port 1235, port 1236, port 1237 and port 1238, in the port forwarding table are acquired, and are used as forwarding ports.

Therefore, this may support broadcast forwarding of the packets from a plurality of processes. Since only the ports and the forwarding indicators are needed for the broadcast, the broadcast forwarding may be independent of specific protocols. In addition, since the port forwarding table may be updated based on the data of the packet from the application before final forwarding, a broadcast behavior of the simulator may be updated in a timely manner.

Figure 9:
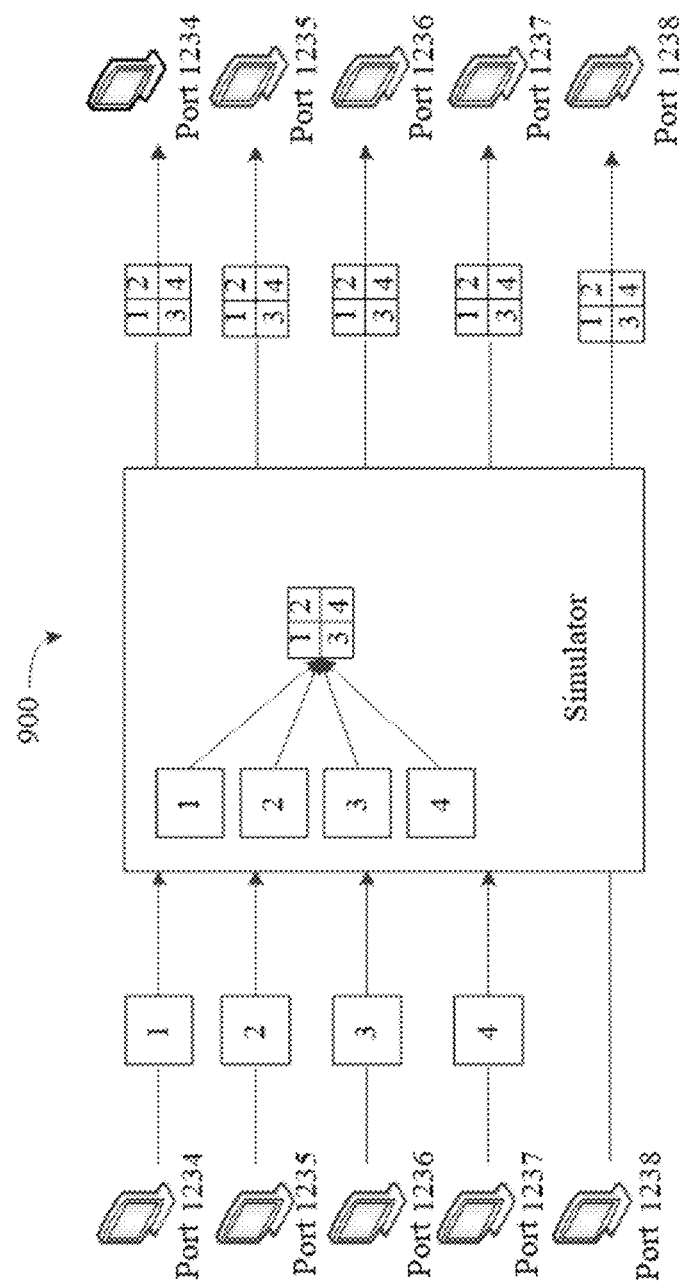
FIG. 9 illustrates a schematic diagram of broadcast according to an embodiment of the present disclosure.

As described above, in some embodiments, the result packet may be obtained by performing the user-defined action on the received packet and the previous result packet. In this case, the situation of a broadcast result packet may be as shown in diagram 900 of FIG. 9, where a single block represents the packet from the application process, and a grid block represents the result packet from the simulator. After packet 1, packet 2, packet 3, and packet 4 from port 1234, port 1235, port 1236, and port 1237 are accumulated by the simulator to obtain the result packet, the result packet is broadcast to port 1234, port 1235, port 1236, port 1237, and port 1238. Therefore, an accumulation result of the packets from a plurality of processes is broadcast, thereby realizing more complex functions.

Figure 10:
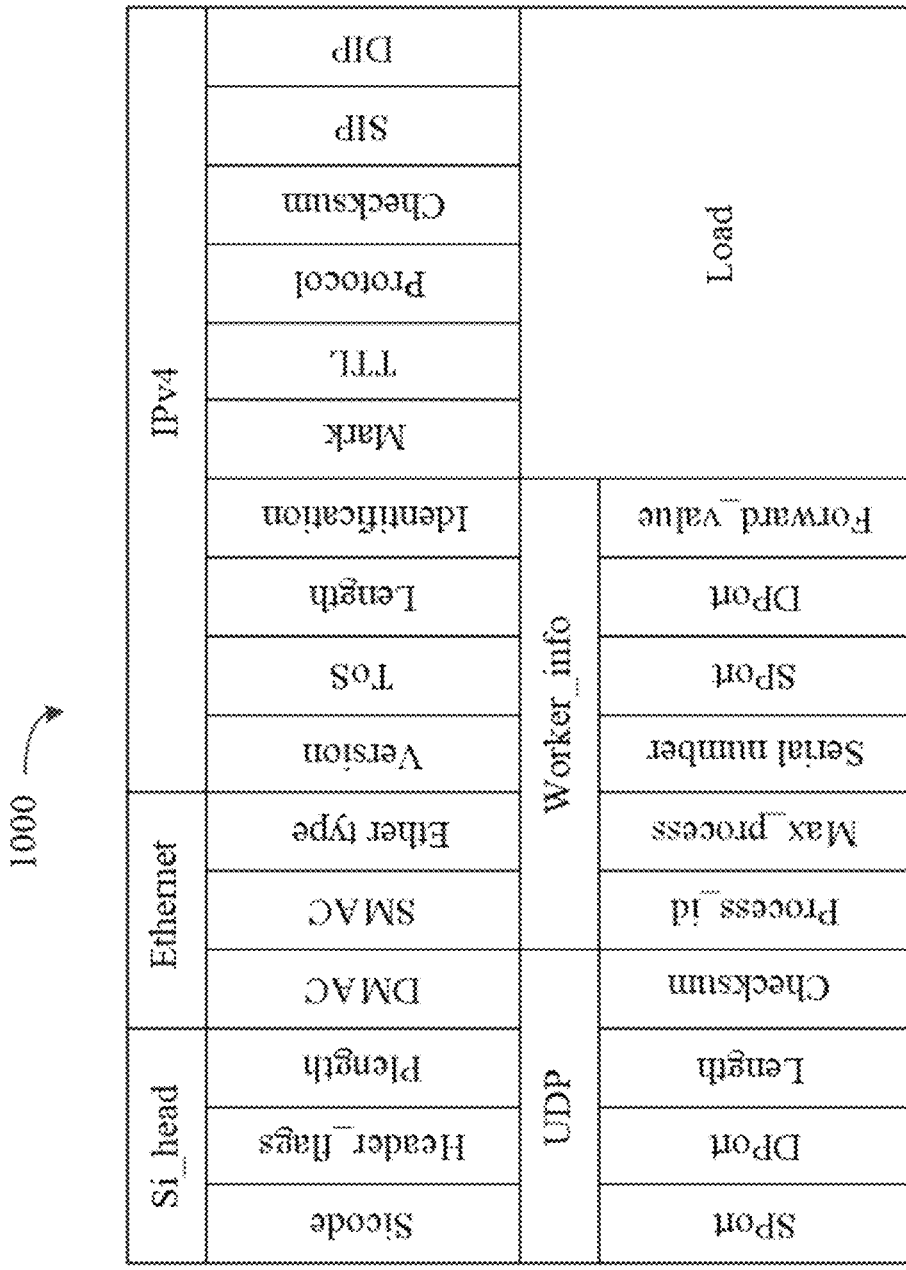
FIG. 10 illustrates a schematic diagram of a packet structure according to an embodiment of the present disclosure.

FIG. 10 illustrates a schematic diagram of packet structure 1000 according to an embodiment of the present disclosure. It should be understood that packet structure 1000 may further include additional tuples not shown and/or the tuples shown may be omitted, and the scope of the present disclosure is not limited in this regard.

As shown in FIG. 10, the header of the packet may include a simulator header Si_head, an Ethernet header, an IPv4 header, a UDP header, and Worker_info, and a load includes actual data carried by the packet. The Si_head and the Worker_info may be designed to be adapted to the programmable switch simulator.

The structures of the Si_head and the Worker_info may be shown in Table 8. The structure of the Si_head may include a Sicode tuple, which is used to indicate that the packet is sent to the programmable switch simulator. The structure of the Si_head may also include a Header_flags tuple, which is used to indicate the header structure of the packet, and a Plength tuple, which is used to indicate a packet length. The packet length may relate to headers of all packets except the Si_head.

In the structure of the Worker_info, Process_id is used to indicate the process identifier, Max_process is used to indicate the maximum number of processes, Serial number is used to indicate a serial number of a packet sent by a process, SPort is used to indicate the source port, DPort is used to indicate the destination port, and Forwarding indicator Forward_value is used to indicate a forwarding state of the packet.

TABLE 8

| Header name | Element | Meaning |
| --- | --- | --- |
| Si_head | Sicode | Indicate whether the packet is sent to the simulator |
|  | Header_flags | Indicate the header structure of the packet |
|  | Plength | Packet length |
| Worker_info | Max_process | Maximum number of processes |
|  | Serial number | Serial number of a packet sent by a process |
|  | Sport | Source port |
|  | DPort | Destination port |
|  | Forward_value | Forwarding state of the packet |

As shown in Table 8, the structure of the header Si_head may include three tuples. The Sicode tuple may be used to indicate that the packet is sent to the programmable switch simulator. The Header_flags tuple may be used to indicate the header structure of the packet, as shown in Table 9.

TABLE 9

| Third bit | Second bit | First bit |
| --- | --- | --- |
| 0: None | 0: None | 0: None |
| 1: UDP | 1: IPv4 | 1: Ethernet |

0x00: The packet does not include the Ethernet header, the IPv4 header, the UDP header
0x01: The packet includes only the Ethernet header
0x02: The packet includes only the IPv4 header
0x03: The packet includes the Ethernet header and the IPv4 header
0x04: The packet includes only the UDP header
0x05: The packet includes the Ethernet header and the UDP header
0x06: The packet includes the IPv4 header and the UDP header
0x07: The packet includes the Ethernet header, the IPv4 header, and the UDP header In some embodiments, an offset position of the Worker_info structure in the header of the packet may be determined based on the Header_flags tuple, and the Worker_info structure is extracted from the offset position. That is, the source port, the destination port, the forwarding indicator, the process identifier, and the maximum number of processes are extracted. In addition, other header structures, such as the Ethernet header, the IPv4 header, and the UDP header, may also be extracted based on the Header_flags tuple. Through the Header_flags tuple, one or more of these headers may also be omitted as needed.

Therefore, one or more header structures may be omitted as needed, thereby reducing the packet redundancy and improving the transmission efficiency.

Figure 11:
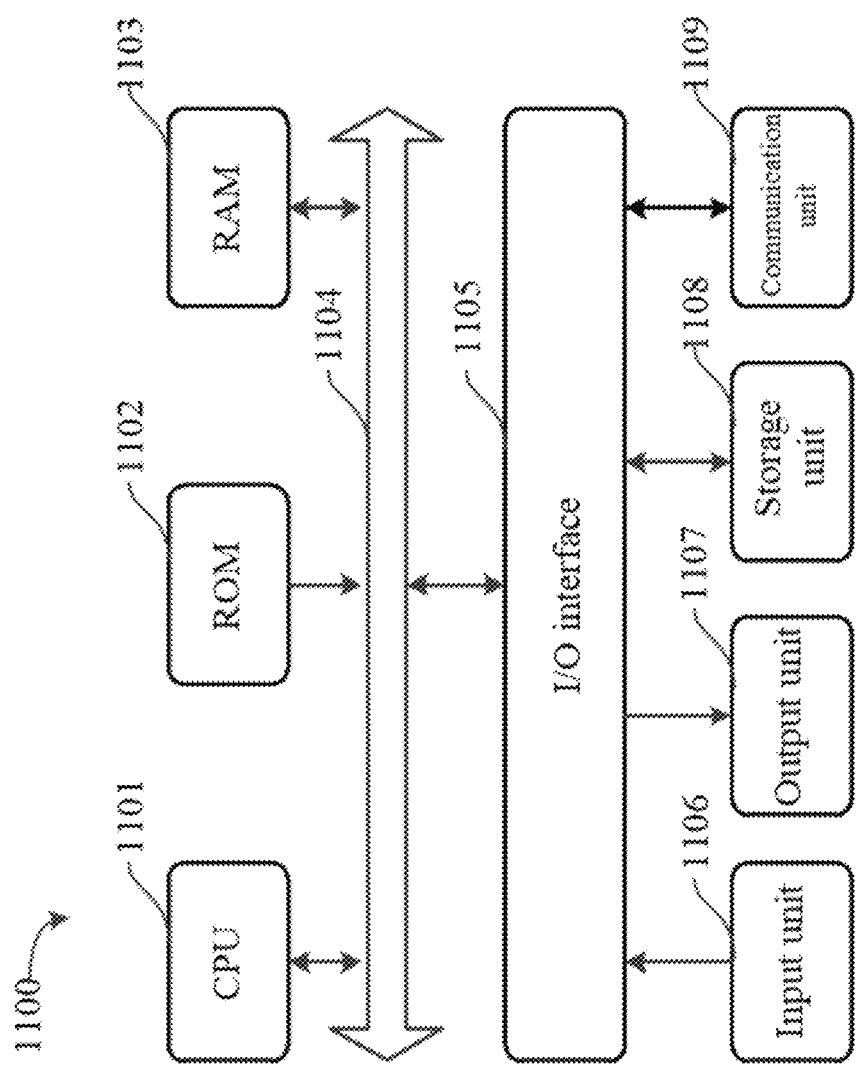
FIG. 11 illustrates a schematic block diagram of an example device for implementing the embodiments of the present disclosure.

FIG. 11 illustrates a schematic block diagram of example device 1100 used for implementing the embodiments of the present disclosure. For example, terminal device 110 and server 120 shown in FIG. 1 may be implemented by device 1100. As shown in the figure, device 1100 includes central processing unit (CPU) 1101, which may execute various appropriate actions and processing according to a computer program instruction stored in read-only memory (ROM) 1102 or a computer program instruction loaded from storage unit 1108 into random access memory (RAM) 1103. RAM 1103 may also store various programs and data required by the operation of device 1100. CPU 1101, ROM 1102, and RAM 1103 are connected to each other through bus 1104. Input/output (I/O) interface 1105 is also connected to bus 1104.

A plurality of components in device 1100 are connected to I/O interface 1105, including: input unit 1106, such as a keyboard and a mouse; output unit 1107, such as various types of displays and speakers; storage unit 1108, such as a magnetic disk and an optical disk; and communication unit 1109, such as a network card, a modem, and a wireless communication transceiver. Communication unit 1109 allows device 1100 to exchange information/data with other devices through a computer network such as the Internet and/or various telecommunication networks.

The various processes and processing described above, such as method 300 to method 600 and method 800, may be performed by processing unit 1110. For example, in some embodiments, method 300 to method 600 and method 800 may be implemented as computer software programs that are tangibly contained in a machine-readable medium, such as storage unit 1108. In some embodiments, part or all of the computer programs may be loaded and/or installed on device 1100 via ROM 1102 and/or communication unit 1109. When a computer program is loaded into RAM 1103 and executed by CPU 1101, one or more actions of method 300 to method 600 and method 800 described above may be performed.

Embodiments of the present disclosure include a method, an apparatus, a system, and/or a computer program product.

The computer program product may include a computer-readable storage medium on which computer-readable program instructions used to execute the various aspects of the present disclosure are loaded.

The computer-readable storage medium may be a tangible device that may maintain and store instructions used by an instruction execution device. The computer-readable storage medium may be, for example, but is not limited to, an electric storage device, a magnetic storage device, an optical storage device, an electromagnetic storage device, a semiconductor storage device, or any suitable combination of the foregoing. More specific examples (a non-exhaustive list) of computer-readable storage media include: portable computer disks, hard disks, random access memories (RAMs), read-only memories (ROMs), erasable programmable read-only memories (EPROMs or flash memories), static random access memories (SRAMs), portable compact disc read-only memories (CD-ROMs), digital versatile discs (DVDs), memory sticks, floppy disks, mechanically encoded devices such as punch-cards or raised structures in a groove having instructions recorded thereon, and any suitable combination of the foregoing. The computer-readable storage media used here are not interpreted as transient signals per se, such as radio waves, other freely propagated electromagnetic waves, electromagnetic waves propagated through waveguides or other transmission media (such as light pulses passing through fiber optic cables), or electrical signal transmitted via wires.

The computer-readable program instructions described here can be downloaded from the computer-readable storage media to various computing/processing devices, or downloaded to an external computer or external storage device via a network, such as the Internet, a local area network, a wide area network and/or a wireless network. The network may include a copper transmission cable, fiber optic transmission, wireless transmission, a router, a firewall, a switch, a gateway computer and/or an edge server. The network adapter card or network interface in each computing/processing device receives a computer-readable program instruction from the network and forwards the computer-readable program instruction for storage in the computer-readable storage medium in each computing/processing device.

The computer program instructions for performing the operations of the present disclosure may be assembly instructions, instruction set architecture (ISA) instructions, machine instructions, machine-related instructions, microcodes, firmware instructions, state setting data, or source or object codes written in any combination of one or more programming languages. The programming languages include object-oriented programming languages, such as Smalltalk and C++, and conventional procedural programming languages, such as the "C" language or similar programming languages. The computer-readable program instructions may be executed entirely on a user computer, executed partially on a user computer, executed as a standalone software package, executed partially on a user computer and partially on a remote computer, executed entirely on a remote computer, or executed on a server. In case that the remote computer is involved, the remote computer can be connected to a user computer through any type of networks, including a local area network (LAN) or a wide area network (WAN), or connected to an external computer (such as through the Internet using an Internet service provider). In some embodiments, an electronic circuit, such as a programmable logic circuit, a field programmable gate array (FPGA), or a programmable logic array (PLA), is personalized by using state information of the computer-readable program instructions. The electronic circuit may execute the computer-readable program instructions to implement various aspects of the present disclosure.

Various aspects of the present disclosure are described herein with reference to the flow charts and/or block diagrams of the method, the apparatus (system) and the computer program product according to the embodiments of the present disclosure. It should be understood that each block of the flow charts and/or block diagrams and combinations of various blocks in the flow charts and/or block diagrams can be implemented by the computer-readable program instructions.

These computer-readable program instructions may be provided to a processing unit of a general-purpose computer, a special-purpose computer, or other programmable data processing apparatuses, thereby producing a machine, so that when these instructions are executed by the processing unit of the computer or other programmable data processing apparatuses, an apparatus for implementing the functions/actions specified in one or more blocks in the flow charts and/or the block diagrams is generated. These computer-readable program instructions may also be stored in the computer-readable storage medium, and these instructions cause a computer, a programmable data processing apparatus, and/or other devices to work in a specific manner. Therefore, the computer-readable medium storing the instructions includes: an article of manufacture that includes instructions for implementing various aspects of the functions/actions specified in one or more blocks in the flow charts and/or the block diagrams.

The computer-readable program instructions may also be loaded onto a computer, other programmable data processing apparatuses, or other devices, so that a series of operating steps can be performed on the computer, other programmable data processing apparatuses, or other devices to produce a computer implemented process, and the instructions executed on the computer, other programmable data processing apparatuses, or other devices implement the functions/actions specified in one or more blocks in the flow charts and/or the block diagrams.

The flow charts and the block diagrams in the drawings illustrate possibly implemented architectures, functions, and operations of systems, methods and computer program products according to various embodiments of the present disclosure. In this regard, each block in the flow charts or the block diagrams may represent a part of a module, a program segment or an instruction, and a part of the module, the program segment or the instruction comprises one or more executable instructions for realizing a specified logic function. In some alternative implementations, the function marked in the block may also happen in an order different from that marked in the accompanying drawing. For example, actually, two continuous blocks may be basically concurrently executed and may also be executed according to an opposite order sometimes, which is decided by the related function. It should also be noted that each block in the block diagrams and/or the flow charts as well as a combination of the blocks in the block diagrams and/or the flow charts may be realized by using a special hardware-based system used for executing the specified function or action or may be realized by using a combination of special hardware and a computer instruction.

The various embodiments of the present disclosure have been described above. The foregoing description is exemplary, not exhaustive, and is not intended to be limited to the disclosed embodiments. Multiple modifications and variations will be apparent to those skilled in the art without departing from the scope and spirit of the illustrated embodiments. The terms used herein were chosen to best explain the principles and practical applications of the embodiments or improvements on technologies in the marketplace, and to otherwise enable others of ordinary skill in the art to understand the embodiments disclosed herein.

What is claimed is:

1. An information processing method, comprising:
   in response to determining that a predetermined indicator is detected in a header of a received packet, acquiring information for indicating a source port, a destination port, a forwarding indicator, a process identifier, and a maximum number of processes of the packet from the header;
   updating a port forwarding table based on the source port, the destination port, and the forwarding indicator;
   performing a user-defined action on the packet to obtain a result packet; and
   in response to determining that a quantity of process identifiers reaches the maximum number of processes, determining one or more forwarding ports for the result packet based on the maximum number of processes, the forwarding indicator, and the updated port forwarding table, to forward the result packet to the one or more forwarding ports.

2. The method according to claim 1, wherein updating the port forwarding table comprises:
   searching for the source port in the port forwarding table; and
   in response to determining that the source port is not found in the port forwarding table, adding the source port, the destination port, and the forwarding indicator into the port forwarding table as an entry.

3. The method according to claim 2, wherein updating the port forwarding table further comprises:
   in response to determining that the source port is found in the port forwarding table, searching for the destination port in the entry of the port forwarding table corresponding to the source port; and
   in response to determining that the destination port is not found in the entry of the port forwarding table corresponding to the source port, adding the source port, the destination port, and the forwarding indicator into the port forwarding table as an entry.

4. The method according to claim 3, wherein updating the port forwarding table further comprises:
   in response to determining that the destination port is found in the entry of the port forwarding table corresponding to the source port, determining whether the acquired forwarding indicator is the same as the forwarding indicator in the entry of the port forwarding table corresponding to the source port and the destination port; and
   in response to determining that the acquired forwarding indicator is different from the forwarding indicator in the entry of the port forwarding table corresponding to the source port and the destination port, updating the forwarding indicator in the entry of the port forwarding table corresponding to the source port and the destination port with the acquired forwarding indicator.

5. The method according to claim 1, wherein determining one or more forwarding ports for the result packet comprises:
   in response to determining that the maximum number of processes is equal to 1, determining whether the forwarding indicator indicates unicast; and
   in response to determining that the forwarding indicator indicates unicast, determining that the destination port is the forwarding port.

6. The method according to claim 1, wherein determining one or more forwarding ports for the result packet comprises:
   in response to determining that the maximum number of processes is greater than 1, determining whether the forwarding indicator indicates multicast; and
   in response to determining that the forwarding indicator indicates multicast, acquiring destination ports in entries of the port forwarding table corresponding to the forwarding indicator as the forwarding ports.

7. The method according to claim 1, wherein determining one or more forwarding ports for the result packet comprises:
   in response to determining that the maximum number of processes is greater than 1, determining whether the forwarding indicator indicates broadcast; and
   in response to determining that the forwarding indicator indicates broadcast, acquiring all destination ports in the updated port forwarding table as the forwarding ports.

8. The method according to claim 1, wherein acquiring the information for indicating the source port, the destination port, the forwarding indicator, the process identifier, and the maximum number of processes of the packet from the header comprises:
   extracting a tuple for indicating a header structure of the packet from the header; and
   extracting tuples for indicating the source port, the destination port, the forwarding indicator, the process identifier, and the maximum number of processes of the packet from the header based on the tuple.

9. The method according to claim 1, wherein performing the user-defined action on the packet comprises:
   performing the user-defined action on the packet and a previous result packet to obtain the result packet.

10. An electronic device, comprising:
    at least one processing unit; and
    at least one memory, coupled to the at least one processing unit and storing instructions executed by the at least one processing unit, wherein the instructions, when executed by the at least one processing unit, enable the device to implement steps of:
    in response to determining that a predetermined indicator is detected in a header of a received packet, acquiring information for indicating a source port, a destination port, a forwarding indicator, a process identifier, and a maximum number of processes of the packet from the header;
    updating a port forwarding table based on the source port, the destination port, and the forwarding indicator;
    performing a user-defined action on the packet to obtain a result packet; and
    in response to determining that a quantity of process identifiers reaches the maximum number of processes, determining one or more forwarding ports for the result packet based on the maximum number of processes, the forwarding indicator, and the updated port forwarding table, to forward the result packet to the one or more forwarding ports.

11. The electronic device according to claim 10, wherein updating the port forwarding table comprises:
    searching for the source port in the port forwarding table; and in response to determining that the source port is not found in the port forwarding table, adding the source port, the destination port, and the forwarding indicator into the port forwarding table as an entry.

12. The electronic device according to claim 11, wherein updating the port forwarding table further comprises:
in response to determining that the source port is found in the port forwarding table, searching for the destination port in the entry of the port forwarding table corresponding to the source port; and
in response to determining that the destination port is not found in the entry of the port forwarding table corresponding to the source port, adding the source port, the destination port, and the forwarding indicator into the port forwarding table as an entry.

13. The electronic device according to claim 12, wherein updating the port forwarding table further comprises:
in response to determining that the destination port is found in the entry of the port forwarding table corresponding to the source port, determining whether the acquired forwarding indicator is the same as the forwarding indicator in the entry of the port forwarding table corresponding to the source port and the destination port; and
in response to determining that the acquired forwarding indicator is different from the forwarding indicator in the entry of the port forwarding table corresponding to the source port and the destination port, updating the forwarding indicator in the entry of the port forwarding table corresponding to the source port and the destination port with the acquired forwarding indicator.

14. The electronic device according to claim 10, wherein determining one or more forwarding ports for the result packet comprises:
in response to determining that the maximum number of processes is equal to 1, determining whether the forwarding indicator indicates unicast; and
in response to determining that the forwarding indicator indicates unicast, determining that the destination port is the forwarding port.

15. The electronic device according to claim 10, wherein determining one or more forwarding ports for the result packet comprises:
in response to determining that the maximum number of processes is greater than 1, determining whether the forwarding indicator indicates multicast; and
in response to determining that the forwarding indicator indicates multicast, acquiring destination ports in entries of the port forwarding table corresponding to the forwarding indicator as the forwarding ports.

16. The electronic device according to claim 10, wherein determining one or more forwarding ports for the result packet comprises:

in response to determining that the maximum number of processes is greater than 1, determining whether the forwarding indicator indicates broadcast; and
in response to determining that the forwarding indicator indicates broadcast, acquiring all destination ports in the updated port forwarding table as the forwarding ports.

17. The electronic device according to claim 10, wherein acquiring the information for indicating the source port, the destination port, the forwarding indicator, the process identifier, and the maximum number of processes of the packet from the header comprises:
extracting a tuple for indicating a header structure of the packet from the header; and
extracting tuples for indicating the source port, the destination port, the forwarding indicator, the process identifier, and the maximum number of processes of the packet from the header based on the tuple.

18. The electronic device according to claim 10, wherein performing the user-defined action on the packet comprises:
performing the user-defined action on the packet and a previous result packet to obtain the result packet.

19. A computer-readable storage medium, storing a computer program that, when executed by a machine, causes the machine to implement an information processing method, the method comprising:
in response to determining that a predetermined indicator is detected in a header of a received packet, acquiring information for indicating a source port, a destination port, a forwarding indicator, a process identifier, and a maximum number of processes of the packet from the header;
updating a port forwarding table based on the source port, the destination port, and the forwarding indicator;
performing a user-defined action on the packet to obtain a result packet; and
in response to determining that a quantity of process identifiers reaches the maximum number of processes, determining one or more forwarding ports for the result packet based on the maximum number of processes, the forwarding indicator, and the updated port forwarding table, to forward the result packet to the one or more forwarding ports.

20. The computer-readable storage medium according to claim 19, wherein updating the port forwarding table comprises:
searching for the source port in the port forwarding table; and
in response to determining that the source port is not found in the port forwarding table, adding the source port, the destination port, and the forwarding indicator into the port forwarding table as an entry.

* * * * *